(12) United States Patent
Risser et al.

(10) Patent No.: US 11,913,759 B2
(45) Date of Patent: Feb. 27, 2024

(54) ENERGY DENSE SOURCE FOR PULSE POWER APPLICATIONS AND NOVEL ELECTROMAGNETIC ARMOR

(71) Applicant: Battelle Memorial Institute, Columbus, OH (US)

(72) Inventors: Steven Risser, Reynoldsburg, OH (US); Mark Stasik, Columbus, OH (US); Kelsey Doolittle, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 157 days.

(21) Appl. No.: 17/518,706

(22) Filed: Nov. 4, 2021

(65) Prior Publication Data

US 2022/0236034 A1  Jul. 28, 2022

Related U.S. Application Data

(62) Division of application No. 16/626,875, filed as application No. PCT/US2018/039869 on Jun. 27, 2018, now Pat. No. 11,181,344.

(60) Provisional application No. 62/525,299, filed on Jun. 27, 2017.

(51) Int. Cl.
| | |
|---|---|
| F41H 5/00 | (2006.01) |
| F41H 5/007 | (2006.01) |
| F41H 5/02 | (2006.01) |
| H01G 11/26 | (2013.01) |
| H01G 11/52 | (2013.01) |
| H01G 11/58 | (2013.01) |
| H01G 11/78 | (2013.01) |

(52) U.S. Cl.
CPC ............... *F41H 5/007* (2013.01); *F41H 5/02* (2013.01); *H01G 11/26* (2013.01); *H01G 11/52* (2013.01); *H01G 11/58* (2013.01); *H01G 11/78* (2013.01)

(58) Field of Classification Search
CPC ........... F41H 5/007; F41H 5/02; H01G 11/26; H01G 11/52; H01G 11/58; H01G 11/78
See application file for complete search history.

(56) References Cited

U.S. PATENT DOCUMENTS

| | | | |
|---|---|---|---|
| 7,466,539 B2 | 12/2008 | Dementiev et al. | |
| 7,819,050 B1 * | 10/2010 | MacDougall | ........... F41H 5/013 89/36.01 |

(Continued)

OTHER PUBLICATIONS

Altgilbers, L.L., "Recent Advances In The Development Of Ferroelectric Generators", Jun. 2013, U.S. Space and Missile Defense CommandlArmy Forces Strategic Command, Huntsville, AL.

(Continued)

*Primary Examiner* — Dion R. Ferguson
(74) *Attorney, Agent, or Firm* — Frank Rosenberg; Susanne A. Wilson (57) ABSTRACT

A supercapacitor-like device is described that uses a porous, conductive foam as the electrodes. After the device is charged, an explosive wave front can be used to remove electrolyte from the metal foam. This creates a large net charge on each electrode, which will readily flow through a load placed across the electrodes. The removal of charge can potentially occur on a time scale of microseconds, allowing a supercapacitor to be used in pulsed power applications. The creation of this net charge requires significant energy, meaning this concept may also be suitable for removing kinetic energy from objects.

20 Claims, 10 Drawing Sheets

(56) References Cited

U.S. PATENT DOCUMENTS

| | | | |
|---|---|---|---|
| 8,722,232 B2 | 5/2014 | Hagiwara et al. | |
| 8,723,390 B2 | 5/2014 | Corbett et al. | |
| 8,807,009 B2 * | 8/2014 | Diehl | F41H 5/007 89/36.17 |
| 9,741,499 B2 | 8/2017 | Zhamu et al. | |
| 10,262,809 B2 | 4/2019 | Lee et al. | |
| 11,121,360 B2 * | 9/2021 | Zhamu | C04B 35/524 |
| 2006/0086243 A1 * | 4/2006 | Seo | F41H 5/007 89/36.17 |
| 2007/0076349 A1 * | 4/2007 | Dementiev | H01G 11/26 361/502 |
| 2012/0214040 A1 * | 8/2012 | Tsutsumi | H01M 10/0413 156/182 |
| 2013/0087038 A1 * | 4/2013 | Diehl | F41H 5/007 89/902 |
| 2014/0057158 A1 * | 2/2014 | Hagiwara | H01G 11/74 429/163 |
| 2020/0225005 A1 * | 7/2020 | Risser | H01G 11/14 |

OTHER PUBLICATIONS

McNab, Ian R., "Pulsed Power Options for Large EM Launchers", IEEE Transactions on Plasma Science, vol. 43, Issue 5, pp. 1352-1357, May 2015, IEEE.

Shkuratov, Sergey I. et al., "Compact autonomous explosive-driven pulsed power system based on a capacitive energy storage charged by a high-voltage shock-wave ferromagnetic generator", Review of Scientific Instruments, vol. 77, issue 6, Jun. 28, 2006, AIP Publishing.

Elsayed, M.A. et al., "An explosively driven high-power microwave pulsed power system", Review of Scientific Instruments, vol. 83, issue 2, Feb. 6, 2012, AIP Publishing.

Neuber, Andreas A. et al., "Magnetic Flux Compression Generators", Proceedings of the IEEE, vol. 92, No. 7, Jul. 2004, pp. 1205-1215, IEEE.

Kurhekar, Madhur S. et al., "Implementation of High Power Microwave Technology in Military Applications", IETE 46th Mid Term Symposium "Impact of Technology on Skill Development" MTS-2015, Special Issue of International Journal of Electronics, Communication and Soft Computing Science and Engineering, pp. 17-21, IJECSCSE.

Altgilbers, L.L. et al., "Chapter 1: Introduction", Explosive Pulsed Power, 2011, pp. 1-12, Imperial College Press, London.

International Preliminary Report on Patentability from international Application No. PCT/US2018/039869 dated Dec. 31, 2019.

Written Opinion from International Application No. PCT/US2018/039869, completed Jul. 18, 2019.

International Search Report from International Application No. PCT/US2018/039869, dated Jul. 18, 2019.

* cited by examiner

ENERGY DENSE SOURCE FOR PULSE POWER APPLICATIONS AND NOVEL ELECTROMAGNETIC ARMOR

RELATED APPLICATIONS

This application is a divisional of U.S. patent application Ser. No. 16/626,875, filed 26 Dec. 2019, which is a U.S. National Stage application of International Application No. PCT/US2018/039869, filed 27 Jun. 2018, and claims the benefit of priority of U.S. Provisional Patent Application No. 62/525,299 filed 27 Jun. 2017.

INTRODUCTION

In a conventional capacitor, the charge is stored in two parallel metal plates, with a charge of +Q on one plate and −Q on the other plate. The charge storage ability of the device is measured by the capacitance, C, which is given by the relation $Q=CV$, where V is the voltage difference between the plates. If a dielectric with dielectric constant $\varepsilon$ is added between the plates, the capacitance is increased by a factor of $\varepsilon$. The capacitance of the device can be expressed simply as $C=A/4\pi s$, where A is the area of the metal plate as s is the separation between the charges. Typically, this separation is on the order of several microns. When an external load is connected between the electrodes, electrons then flow from the ground electrode to the positively charged electrode. Because the charge is stored as electrons in the metal, the device can respond rapidly to the connection of the load, with response time far shorter than a microsecond, which is the relevant time scale for many of the envisioned applications.

More recently, there has been much development of supercapacitors, which are a modification to the conventional capacitor design. In a supercapacitor, the flat metal plates are replaced by high surface area carbon or metal oxide materials, which increases the area by a factor of 1000 or more. Secondly, the charge on an electrode is now balanced by the formation of a charged layer within the liquid electrolyte that infuses throughout the electrode. This decreases the separation between charged to the order of a few nanometers, instead of microns. This combination of increased surface area and decreased separation results in a device where the capacitance has increased by 6 or more orders of magnitude. This also implies that several orders of magnitude more charge can be stored within the same volume with a supercapacitor compared to a conventional capacitor. Instead of a microfarad being viewed as a large capacitance, it is possible to make 5000 F capacitors that fit into your hand.

A limitation to these supercapacitors is that the response time is not determined by the speed of the holes or electrons that are on the electrodes, but the rate at which the ions in the electrolyte can diffuse away to remove the charge layer. This slow diffusion of the ions causes the response time of a supercapacitor to be on the order of milliseconds to seconds, much slower than required for many applications.

SUMMARY OF THE INVENTION

In a first aspect, the invention provides an explosion-powered supercapacitor, comprising: first and second porous electrodes connectable to a power source and resistive load ("connectable" means able to be connected to the power source to generate a potential or connected to the resistive load to allow discharge of the supercapacitor); a first liquid electrolyte in contact with the first porous electrode; a second liquid electrolyte in contact with the second porous electrode; a separator disposed between the first and second electrolytes; an explosive charge, wherein at least the first or second electrodes are in compressive contact with the explosive charge. "Compressive contact" means that the explosive charge is disposed with respect to the electrode such that the force of the explosion compresses the electrodes and decreases the volume of electrolyte stored within the electrodes.

An "explosion" has the conventional meaning. An explosion is a rapid release of stored chemical and/or mechanical energy. An explosion releasing stored chemical energy may result in the generation and release of gases at high pressure and/or temperature. The explosive will generate a compressive wavefront, which can be propagated through air and/or a rigid structure.

Typically, the same electrolyte solution is used to fill the supercapacitor and thus provide both the first and second liquid electrolyte. When the device is uncharged, the compositions of the electrolytes are typically the same. The amount of electrolyte ejected from each electrode does not need to be balanced, but the closer to balanced, the more energy can be obtained from the device.

In some embodiments, the supercapacitor comprises at least one electrolyte outlet. The at least one electrolyte outlet can be a single outlet through which flows the electrolyte ejected from both electrodes, or could be a plurality of outlets; for example, two outlets for the electrolyte from the first electrode and two outlets for the electrolyte from the second electrode. In some embodiments, the first and second electrodes are directly adjacent to the separator.

In a another aspect, the invention provides a method of generating an energy pulse, comprising: providing a supercapacitor, comprising: first and second porous electrodes connectable to a power source and a resistive load; a first liquid electrolyte in contact with the first porous electrode; a second liquid electrolyte in contact with the second porous electrode; a separator disposed between the first and second electrolytes; applying a potential between the first and second porous electrodes; creating an explosion that compresses the electrodes and reduces the volume of each porous electrode and ejects electrolyte from the porous electrodes thus increasing the potential between the electrodes and increasing the energy stored in the supercapacitor; and subsequently discharging (at least a portion of) the energy stored in the supercapacitor. Preferably, at least 0.01% of the chemical energy of the explosive charge is converted to electrical energy, more preferably at least 0.05%, or at least 0.1%, or at least 1% and, although 100% is theoretically possible, in some embodiments a practical limit may be 10%.

In some embodiments, the step of compressing is sufficiently fast such that at least 0.1% (or at least 0.5%, or at least 1.0%, or at least 2.0%, or up to 20% or up to 10%) of the net charge contained in the electrolyte within the electrodes is ejected with the electrolyte during compression. The net charge can be calculated from measuring the current as a function of time when charging the supercapacitor.

In a further aspect, the invention provides a method of converting chemical energy to electrical energy, comprising: wherein energy is initially stored as chemical energy in an explosive charge; triggering the explosion to convert the chemical energy to kinetic energy associated with an explosive wavefront; wherein the impact of the wavefront on the electrode transfers kinetic energy to an electrolyte in a supercapacitor having porous conductive electrodes; converting a portion of the transferred kinetic energy in the electrolyte to electrical energy stored in the supercapacitor. This stored electrical energy is then available for pulse power applications.

In a another aspect, the invention provides an armor panel, comprising in sequence: a first armor plate, an anode, a first electrolyte, a porous insulating separator, a second electrolyte, a cathode, and a second armor plate; and an electrical connection between the anode and cathode; and further comprising at least one outlet for the first electrolyte and the second electrolyte; and wherein the components are connected such that, when a kinetic or conductive threat impacts or travels through an armor plate, the first and second electrolyte are ejected and a potential between cathode and anode is increased.

A conductive threat could be, for example, an explosively formed penetrator. For a conductive threat, the compression of the electrodes leads to a high voltage, and the conductive threat contacts both an anode and cathode, current will flow through the conductive threat, which reduces its effectiveness. In the case of a kinetic threat (normal tank gun round), the compression of the electrodes and ejection of the electrolyte is achieved using energy coming from the round, which reduces its effectiveness.

The device can function with a single anode where the supercapacitor is electrically isolated from the armor. Preferably, the panel contains two anodes so that the cathode could be isolated in the interior of the device. In some embodiments, the cathode is shared with a second anode and the armor panel further comprises a third electrolyte, a second porous insulating separator, and a fourth electrolyte; all disposed between the first and second armor plates.

The invention also includes a method of reducing a conductive or kinetic threat using the armor panel described herein.

DESCRIPTION OF THE INVENTION

The current invention speeds the removal of the ions in the charge layer, allowing the large stored charge to rapidly flow through an external load.

The supercapacitor electrodes comprise a high surface area, conductive (typically metal) foam. The conductive foam may have a surface area of 100 $m^2/g$ or higher, while preferably having a mass density of 1 $g/cm^3$ or less. Surface area can be measured by gas adsorption (BET). The conductive foam has an open pore structure. The pair of electrodes will then be placed into an electrolyte solution, and the device charged until the amount of charge is saturated at the operating voltage of the electrolyte. For example, if the device has capacitance of 0.5 F and operating voltage of 2.5V, 1.25 C of charge will be on each electrode. Although there is a charge of 1.25 C on each electrode, there is a counter-balancing charge of 1.25 C within the electrolyte that is infused into each electrode. So although there is a large charge stored on the conductive foam, from the exterior, the conductive foam appears to have no charge.

To activate the device, an explosive charge, or other large impulse is applied to each electrode to compress the foam. This will result in the expulsion of the electrolyte from the foam as it crushes. The expulsion of the electrolyte will now lead to each electrode plus infused electrolyte system to have a large net charge. If a load is now placed across the electrodes, a significant portion of the stored 1.25 C charge will flow. Because the time to compress the electrode can be on the order of a microsecond, the response time of the device can now also be on the order of a microsecond.

There is a need for a device capable of providing high power pulsed energy. For example, lasers could use such a device. For many applications, the need is for a power source capable of a high number of repetitions, while other applications may only one or a limited number of repetitions. As part of this invention, it is believed it is possible to design a device using this invention that would be capable of multiple repetitions. For example, the supercapacitor device would be fed into a chamber, where a chemical explosive is used to compress the device. After compression and discharge of the device, it is removed from the chamber, and a new device introduced. Alternatively, an elastic, compressible porous electrode could be used over multiple repetitions where the explosion doesn't irreversibly alter the electrode.

Compared to other devices for converting chemical energy into high power electrical pulses, this invention can provide high power electrical pulses with a much less complex design, and less infrastructure needed to provide the power pulse. The mechanism of action in this invention is very distinct from the prior art. In some of the prior art, a seed current is needed, which is not required here. Much of the prior art also requires significant machining of the device, which is then destroyed after a single use. Technologies that use seed currents often are very sensitive to the inductance of the load. Ferroelectric and ferromagnetic technologies do not convert chemical energy into electrical energy, but instead use the explosive to disrupt the ferroelectric or ferromagnetic domains. The device can then only release the energy stored in these domains, which is orders of magnitude lower than the energy available from chemical explosives.

Figure 1:
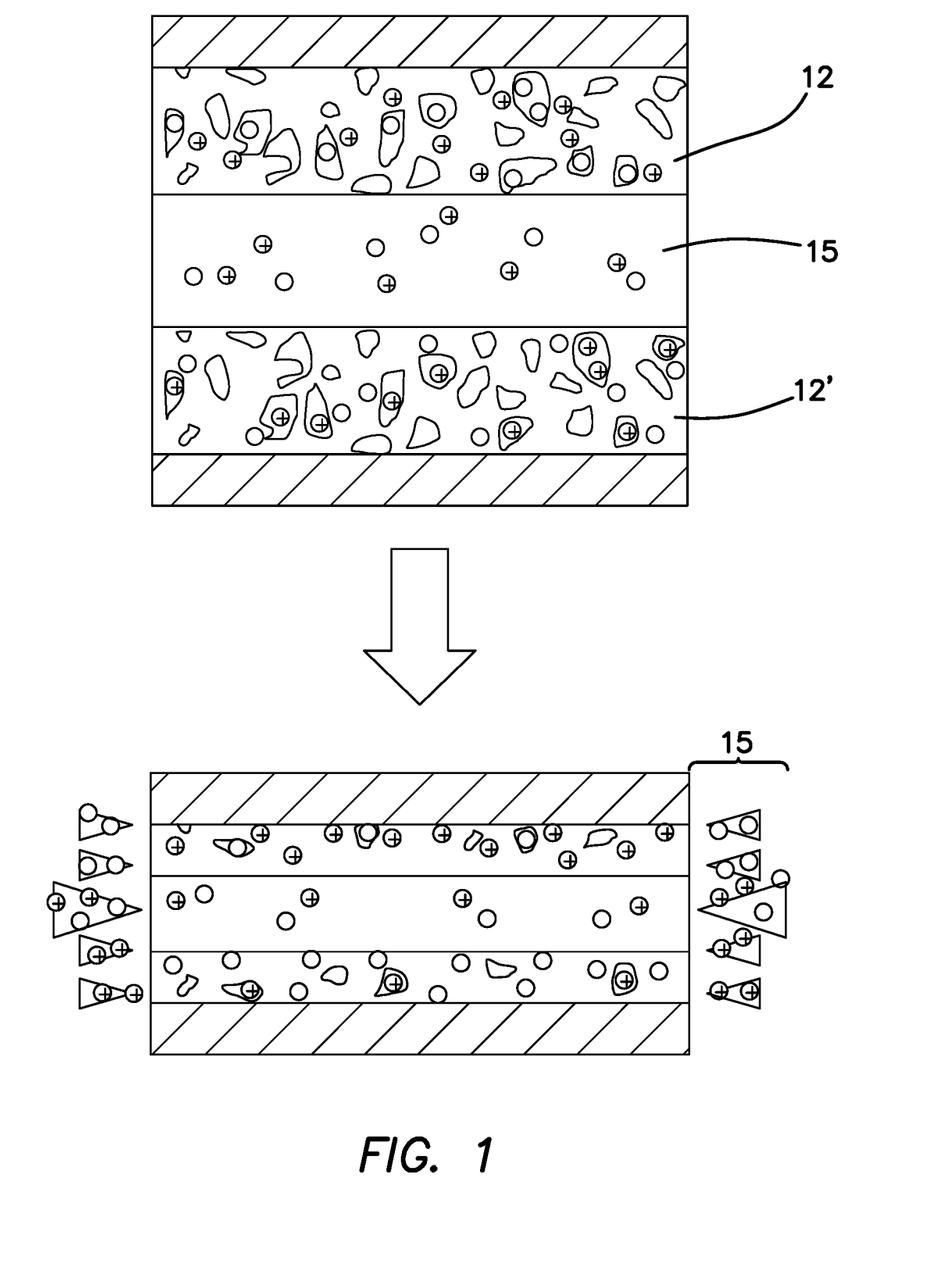
FIG. 1 is a schematic of device operation.

The fundamental principal is shown in FIG. 1 (note that the separator is not shown). FIG. 1 illustrates a supercapacitor is formed from a pair of porous metallic electrodes 12, 12' (shown in gray). The device is charged, which places a large net charge on each of the metallic electrodes (positive on one electrode 12', negative on the other 12), with a counter net charge contained in the electrolyte that resides within each porous electrode. The net total charge on the electrode plus electrolyte contained within the electrode is zero. The application of a large, rapid, force either through an explosion or other mechanical means expels electrolyte 15 from each electrode. This expulsion removes part of the net charge that was contained in the electrolyte. This leads to each electrode plus electrolyte pairing to now have a net charge. Because the capacitance between the electrode plus electrolyte pairs is very small, this net charge results in a very large potential difference between the electrodes, which also implies a large amount of stored electrical energy, which results from the work done by the explosion in expulsing the charged electrolyte.

Figure 2A:
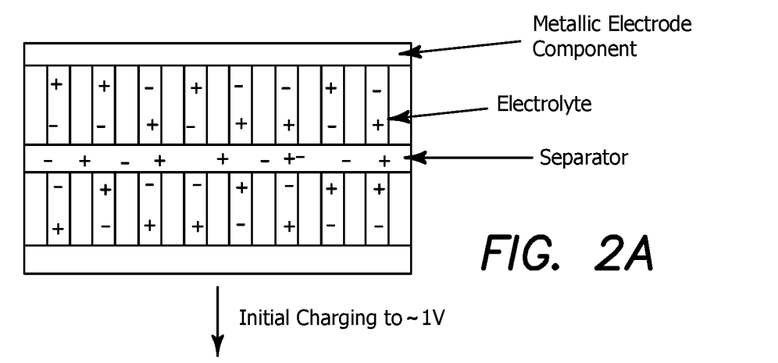
FIGS. 2a-2c is another schematic illustration of the activation of the device, a) the uncharged device, b) the device after charging to about 1V, which places large net charges on the metallic electrode component and electrolyte within each electrode, and c) the device after explosive compression and ejection of electrolyte, resulting in an unbalanced charge on each metallic component. This charge is at large potential difference and is available for rapid discharge in pulse power applications.
Figure 2B:
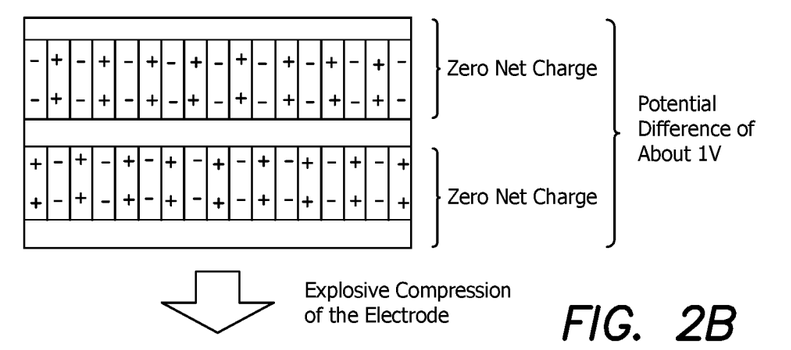
Figure 2C:
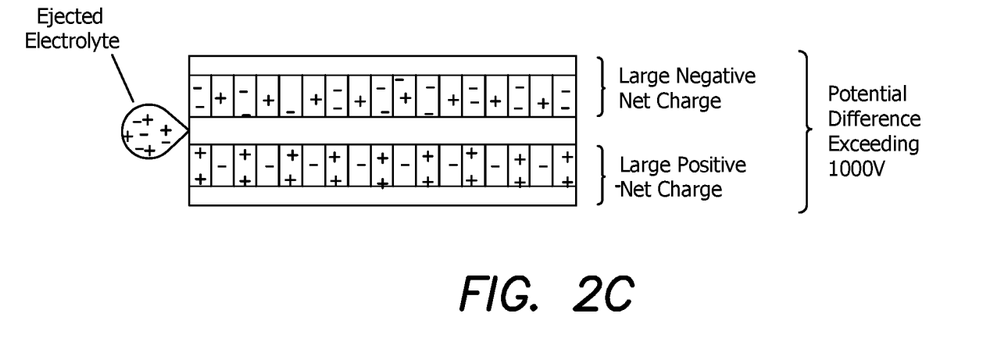

Another schematic view of the inventive method is shown in FIGS. 2a-2c. FIG. 2a shows the capacitor in the uncharged state, where there is no charge residing on the metallic component of either electrode (brown) while the net ionic charge in the electrolyte (blue) is zero. FIG. 2b shows the supercapacitor after it has been charged to approximately 1V. There is now a large charge in each of the metallic electrode components, while there is a net charge of equal magnitude but opposite sign in the electrolyte within the electrode, resulting in zero net charge on either half of the device. FIG. 2c then shows the supercapacitor after the explosive compression of the electrodes. The compression decreases the amount of electrolyte that can be contained in each electrode, and as the electrolyte is ejected it carries some of the net charge in that portion of the electrolyte. However, the compression does not alter the amount of charge contained in the metallic component of each electrode. This results in each half of the device now having a large net charge. This net charge produces a large potential difference across the electrodes. If these electrodes are now connected across a load, a very large current can flow, providing the pulse power response.

The overall flow of energy in the device is:
1. Energy is initially stored as chemical energy of the explosive
2. Triggering the explosion converts the chemical energy to kinetic energy associated with the explosive wavefront
3. The impact of the wavefront on the electrode transfers kinetic energy to the electrolyte
4. The kinetic energy of the moving net charge in the electrolyte is converted to electrical energy stored by the charge on the metallic electrode components.

This stored electrical energy is then available for pulse power applications.

Typically, the amount of total charge needed in a pulse power application is relatively low. For example, a current of 100 kA that flows for 10 μsec only requires 1 C of charge to be stored in the device. This amount of charge is small by supercapacitor standards where 10,000 C can be stored in a handheld device. This implies that only a small fraction of the charge in the electrolyte must be ejected for the device to function as a pulse power source. The second is that the wavefront from the explosive can compress the electrode layer in a few microseconds or less. It is the speed and energy of this explosive wavefront that causes the charge in the electrolyte to be ejected rapidly from the electrode, which is responsible for the conversion of the kinetic energy from the explosion into the electrical energy released from the device.

Figure 3:
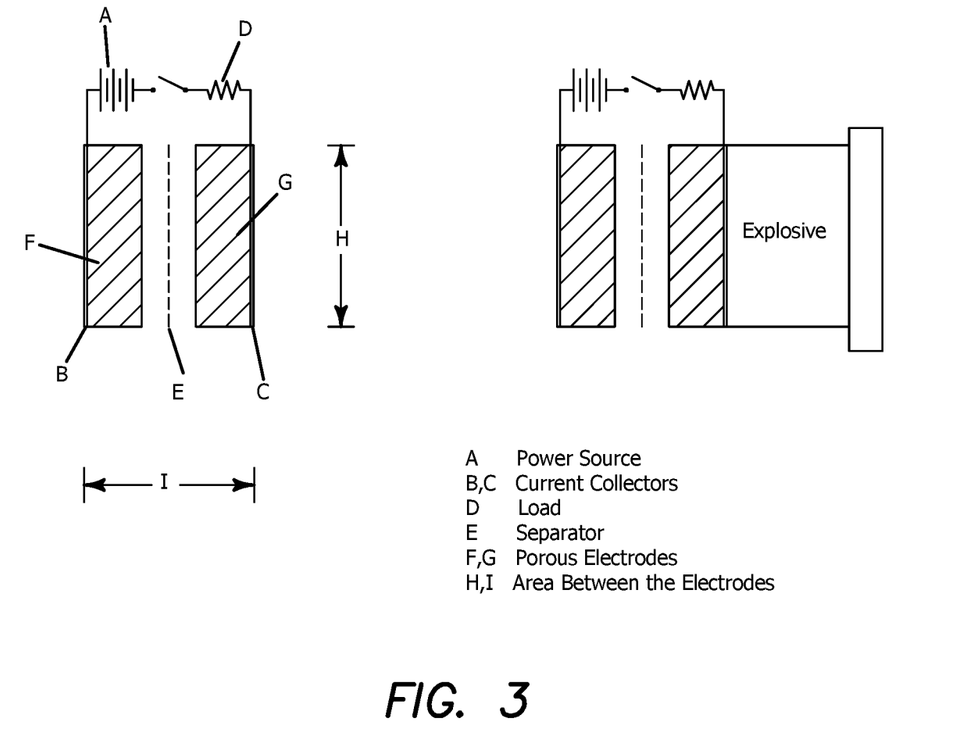
FIG. 3 is a schematic illustration of a system for generating an electrical pulse.

FIG. 3 is a schematic illustration of a system for generating an electrical pulse. An explosive is disposed in compressive contact with at least one porous electrode. The device includes current collectors B, C, and porous conductive electrodes F, G that are separated by separator E. Initially, a potential is established by power source A. After the explosive is discharged, the resulting wavefront compresses the supercapacitor (reducing the length I) and forces electrolyte (carrying opposite charge from opposing sides of the separator) out of the volume of the supercapacitor (volume is defined by H×I×Z (where Z is in direction perpendicular to page)). Thus generating a very high potential between electrodes G and F that can be discharged as an electrical pulse through load D.

The various components are known. The porous, conductive electrodes can be any of the known electrode materials such as carbon-based composite materials with materials such as carbon nanotubes and graphene; metal oxides (e.g., $MnO_2$, $RuO_2$); conductive polymers; mixtures of these materials, preferably porous metals such as a porous nickel foam. Some of these such as the conductive polymer composites can be elastic. The porous electrode should have connective porosity so that electrolyte is expressed from the electrodes by the wavefront. The electrolyte is a solvent with dissolved chemical(s). The solvent can be water or an organic solvent.

Preferably, the separator is in contact with the electrodes. This configuration helps convey the stress needed to compress the electrodes. In some embodiments, the explosion pushes the first electrode from one side; the first electrode is then pushed against the separator, which then pushes against the second electrode.

A model to understand the basic function of the proposed device has been developed, making assumptions about composition of the electrode, and the fraction of the net charge ejected with the electrolyte during compression. The results show that even if less than 1% of the net charge in the electrolyte is ejected from the electrode, the voltage across the device could approach or exceed several thousand volts.

There are several factors to notice about this concept. First is that the amount of total charge needed in a pulse power application is relatively low. A current of 100 kA that flows for 10 μsec only requires 1 C of charge to be stored in the device. This amount of charge is small by supercapacitor standards where 10,000 C can be stored in a handheld device. This implies that only a small fraction of the net charge of the electrolyte held within the electrode must be ejected for the development of large voltage across the device.

Figure 4:
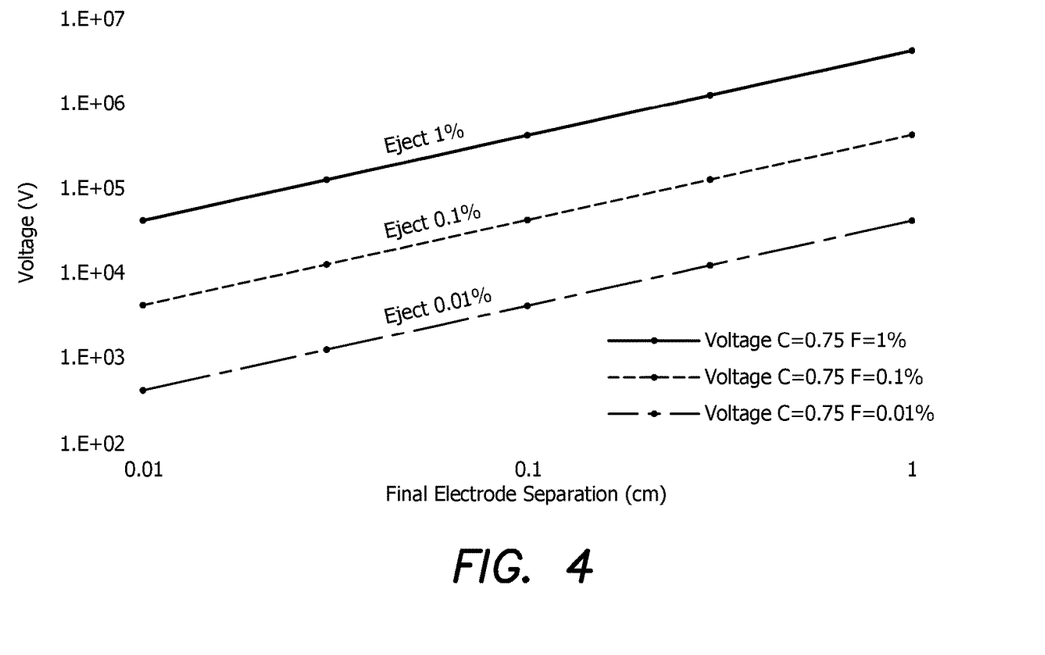
FIG. 4 illustrates the potential difference between the electrodes for ejections of 1%, 0.1% and 0.01% (top to bottom).

As shown below, we developed a model to calculate the expected performance of such a device. The key inputs to this model include the electrode initial porosity and thickness, and the initial surface area. Other key inputs include the electrode thickness after the crush, the final separation between the electrodes, and the fraction of the net charge that is removed during the crushing event. This model assumed the pores are initially cylindrical, but become flattened as the electrode is crushed. The total number of pores did not change. The crushing reduces the surface area, but this will be shown to be negligible. FIG. 4 shows the potential difference between the two electrodes as a function of the final separation between the electrodes. The electrodes are crushed 75% (C=0.75), and the fraction of the net electrolyte charge that is ejected is varied (F=1%, 0.1%, 0.01%).

Figure 5:
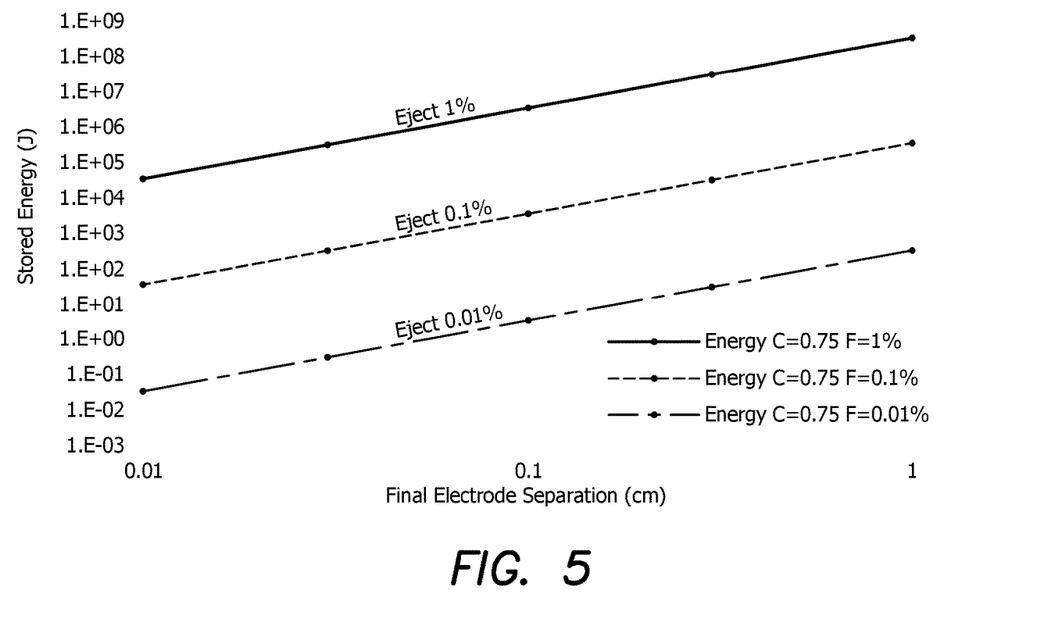
FIG. 5 illustrates the energy stored for ejections of 1%, 0.1% and 0.01% (top to bottom).
Figure 6:
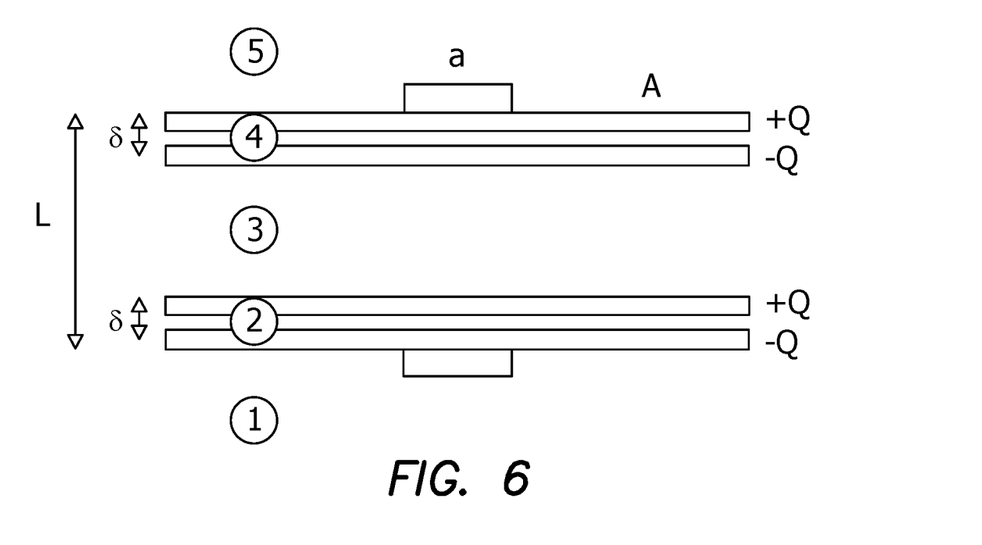
FIG. 6 illustrates a supercapacitor that accompanies a calculated example.
Figure 7:
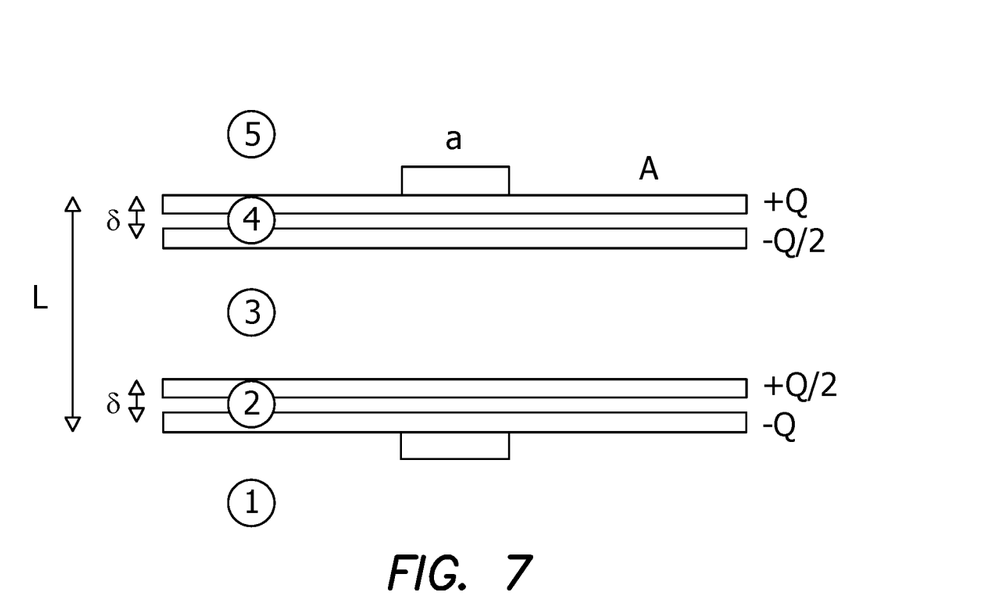
FIG. 7 illustrates a supercapacitor that accompanies a calculated example of the invention.
Figure 8:
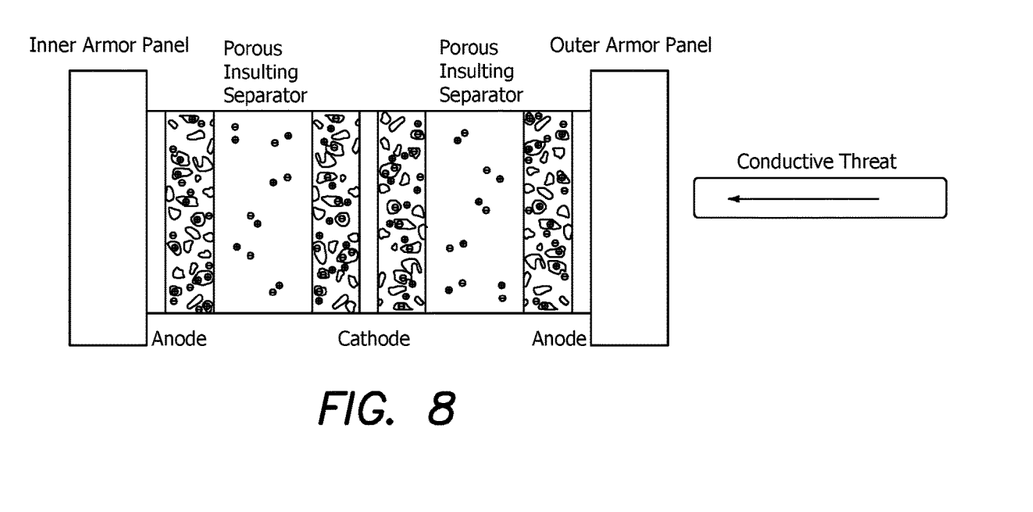
FIG. 8 is a schematic illustration of an embodiment of the armor concept.

FIG. 5 shows the stored energy as a function of the final separation between the electrodes. The electrodes are crushed 75% (C=0.75), and the fraction of the net electrolyte charge that is ejected is varied (F=1%, 0.1%, 0.01%). As shown in the figure, if even as little as 1% of the net charge in the electrolyte is removed, the device can contain from 10 kJ to more than 1 MJ. All this stored electrical energy comes from the conversion of the mechanical energy of the explosion or impact into electrical energy.

The following calculated example illustrates the concept in more detail.

Case 1. Conventional Supercapacitor

Determine the energy stored in a conventional supercapacitor, where there is a pair of current collectors with area a. There are two electrodes with high surface area (area A>>a) metal foams, which hold charges +Q and −Q, which are then counter-balanced by charges −Q and +Q which originate from the liquid electrolyte.

Calculate the fields, voltages, and energy stored in the system $$E_1 = \frac{2\pi Q}{a} - \frac{2\pi Q}{a} + \frac{2\pi Q}{a} - \frac{2\pi Q}{a} = 0 \quad \text{For Region 1)}$$

$$E_2 = -\frac{2\pi Q}{A} - \frac{2\pi Q}{A} + \frac{2\pi Q}{A} - \frac{2\pi Q}{A} = -\frac{4\pi Q}{A} \quad \text{For Region 2)}$$

$$E_3 = -\frac{2\pi Q}{a} + \frac{2\pi Q}{a} + \frac{2\pi Q}{a} - \frac{2\pi Q}{a} = 0 \quad \text{For Region 3)}$$

$$E_4 = -\frac{2\pi Q}{A} + \frac{2\pi Q}{A} - \frac{2\pi Q}{A} - \frac{2\pi Q}{A} = -\frac{4\pi Q}{A} \quad \text{For Region 4)}$$

$$E_5 = -\frac{2\pi Q}{a} + \frac{2\pi Q}{a} - \frac{2\pi Q}{a} + \frac{2\pi Q}{a} = 0 \quad \text{For Region 5)}$$

We will define the following quantities $C_0 = a/4\pi L$ $C_1 = A/4\pi\delta$

The voltage at the bottom current collector is assumed to be zero. The voltage at the top of region 2 is given by $$V = \left(\frac{4\pi Q}{A}\right)\delta = \frac{Q}{C_1}$$

The voltage at the top of region 3 is given by $$V = \left(\frac{4\pi Q}{A}\right)\delta = \frac{4\pi Q}{A}\delta = = \frac{Q}{C_1}$$

The voltage at the top of region 4 is then given by $$V = \left(\frac{4\pi Q}{A}\right)\delta + \left(\frac{4\pi Q}{A}\right)\delta = \frac{8\pi Q}{A}\delta = 2\frac{Q}{C_1}$$

The energy stored in the system is given by $$\text{Energy} = \frac{1}{2}QV = \frac{Q}{2}\left(\frac{4\pi Q}{A}\right)\delta - \frac{Q}{2}\left[\left(\frac{4\pi Q}{A}\right)\delta\right] + \frac{Q}{2}\left[\left(\frac{4\pi Q}{A}\right)\delta + \left(\frac{4\pi Q}{A}\right)\delta\right]$$

$$\text{Energy} = Q\left(\frac{4\pi Q}{A}\right)\delta = Q^2 C_1$$

Case 2. This Invention

Determine the energy stored in a partially modified supercapacitor, where there is a pair of current collectors with area a, holding charge q. There are two electrodes with high surface area (area A>>a) metal foam, which hold charges +Q and −Q, which are then counter-balanced by charges −Q and +Q which originate from the liquid electrolyte. This device configuration can be created by mechanically driving the liquid electrolyte partially out of the system.

Calculate the fields, voltages, and energy stored in the system $$E_1 = \frac{2\pi Q}{a} - \frac{\pi Q}{a} + \frac{\pi Q}{a} - \frac{\pi Q}{a} = 0 \quad \text{For Region 1)}$$

$$E_2 = -\frac{2\pi Q}{A} - \frac{\pi Q}{A} + \frac{\pi Q}{A} - \frac{2\pi Q}{A} = -\frac{4\pi Q}{A} \quad \text{For Region 2)}$$

$$E_3 = -\frac{2\pi Q}{a} + \frac{\pi Q}{a} + \frac{\pi Q}{a} - \frac{2\pi Q}{a} = -\frac{2\pi Q}{a} \quad \text{For Region 3)}$$

$$E_4 = -\frac{2\pi Q}{A} + \frac{\pi Q}{A} - \frac{\pi Q}{A} - \frac{2\pi Q}{A} = -\frac{4\pi Q}{A} \quad \text{For Region 4)}$$

$$E_5 = -\frac{2\pi Q}{a} + \frac{\pi Q}{a} - \frac{\pi Q}{a} + \frac{2\pi Q}{a} = 0 \quad \text{For Region 5)}$$

We will define the following quantities $C_0 = a/4\pi L$ $C_1 = A/4\pi\delta$

The voltage at the bottom current collector is assumed to be zero. The voltage at the top of region 2 is given by $$V = \left(\frac{4\pi Q}{A}\right)\delta = \frac{Q}{C_1}$$

The voltage at the top of region 3 is given by $$V = \left(\frac{4\pi Q}{A}\right)\delta + \left(\frac{2\pi Q}{a}\right)(L - 2\delta) = \frac{4\pi Q}{A}\delta + \frac{2\pi Q}{a}(L - 2\delta) = \frac{Q}{C_1} + \frac{Q}{2C_0}(1 - 2\delta/L)$$

The voltage at the top of region 4 is then given by $$V = \left(\frac{4\pi Q}{A}\right)\delta + \left(\frac{2\pi Q}{a}\right)(L - 2\delta) + \left(\frac{4\pi Q}{A}\right)\delta = 2\frac{Q}{C_1} + \frac{Q}{2C_0}(1 - 2\delta/L)$$

The energy stored in the system is given by $$\text{Energy} = \frac{Q}{4}\left[\frac{Q}{C_1}\right] - \frac{Q}{4}\left[\frac{Q}{C_1} + \frac{Q}{2C_0}(1 - 2\delta/L)\right] + \frac{Q}{2}\left[2\frac{Q}{C_1} + \frac{Q}{2C_0}(1 - 2\delta/L)\right]$$

$$\text{Energy} = \frac{Q^2}{C_1} + \frac{Q^2}{8C_0}(1 - 2\delta/L)$$

Assume the metal foam has surface area of 100 m²/g and density of 1 g/cm³. Assume the separation between charges in the metal foam is 10 nm on average The electrode area is 1 cm² with separation 0.1 cm. Assume foam thickness of 10 microns.

The foam has volume $10^{-3}$ cm³, so A=0.1 m²=1000 cm²

$$C_0 = 1 \text{ cm}^2/4\pi(0.1 \text{ cm}) = 10/4\pi \text{cm} \quad\quad 5$$

$$C_1 = 1000 \text{ cm}^2/4\pi 10 \text{ nm} = 10^9/4\pi \text{cm}$$

So $C_1 = 10^8 C_0$ This shows why supercapacitors have become a preferred device for storing charge.

So if we take a device where $C_1=1$ F, and place 1.25V across it, Q=1.25 C. Because of the two capacitance layers, the full device would be rated as a 0.5 F capacitor, and the voltage across the device would be 2.5V. The energy stored in this device would be 1.56 J.

If we assume we removed the half the charge from the middle layers, the total energy now would be more than 19 MJ, a more than $10^7$ increase in energy.

This large increase in stored energy is conversion of mechanical energy used to remove charge in the form of the electrolyte from the system.

Electromagnetic Armor

The deployment of electromagnetic armor and other energy weapons requires power sources able to provide current pulses greater than 10 kA for durations of tens of microseconds. Traditional metallic armor functions by dissipating the energy of a threat through localized plastic work within the metal. Composite armor dissipates energy through delamination of the fiber from the resin and back-face deformation. However, both these approaches have been challenged to defeat the threat associated with explosively formed penetrators (EFP).

Electromagnetic armor has been of high interest as a new approach to countering the threat from EFPs. Electromagnetic armor looks to apply a large electric current to the EFP. The forces applied to the EFP by the current, and the heat generated by the current flow, act to speed the separation of the penetrator into smaller particles, which pose a lesser threat.

One of the limitations of electromagnetic armor is the need to provide large currents (>20 kA) at any point of the armor. This historically has required using large capacitor banks that are charged to voltages above 10,000V. This voltage poses an extreme safety hazard to test personnel, and would be very challenging to implement in the field. Additionally, the response of the current to the EFP becomes dominated by the inductance of the cables connecting the capacitor bank to the armor. In a real world system, it would be very challenging to have a single capacitor bank supply power to the armor for a large vehicle without weight of the cabling becoming unmanageable.

A key component to this concept is understanding that although electromagnetic armor requires very large currents, these currents are active for times on the order of tens of microseconds. This implies that the total charge required to power the system, Q, is actually not large. As an example, if a current of 50 kA flows for 100 microseconds, the total charge is only 5 C.

A modified version of this invention can be applied to power electromagnetic armor, as part of the armor itself. The basic configuration of the armor is shown in FIG. 3. Advantageously, the electrochemical cell can be directly incorporated between two armor panels, and no heavy cabling is required to carry the current to the armor plates. Instead, the distortion of the armor plate by the EFP acts to generate the free current and voltage needed to defeat the EFP.

In this concept, two armor panels that are separated by a pair of supercapacitors that share a common cathode current collector. The operation of the armor occurs in several steps:

1) When the conductor strikes the outer armor panel, the panel is deflected inwards while also being penetrated.
2) The deflection of the panel results in crushing the metal foam electrodes
3) Crushing the electrodes ejects charged electrolyte from the electrodes and results in a large net charge and large potential difference between the electrodes
4) When the conductive threat reaches the second electrode, a large current will flow through the conductor.
5) As the conductive threat continues to penetrate the armor, the second pair of electrodes also become crushed, resulting in large net charge and voltage.
6) When the conductive threat reaches the back electrode, current will also flow between the second pair of electrodes.
7) If the first pair of electrodes and second pair of electrodes are arranged perpendicular to each other, the change in current insertion point will speed degradation of the threat.

Advantages of the present invention may include: the first is that energy is extracted from the threat to create the net charge and voltage on the supercapacitor electrodes, and the amount of energy that is removed from the threat could be significant; second, the incorporation of the potential energy source within the armor plates eliminates the need for a large external power source that must be connected to the armor via large, heavy cables; the elimination of the cabling reduces the inductance of the system, allowing the large currents to rise much more rapidly than is possible in conventional electromagnetic armor; third, the system, when in its charged, operational state, can be charged to 10V or less, for example only charged to about 2.5V, and this voltage is on the interior electrode in the paired supercapacitor devices; fourth, modulation of the current can be intrinsically incorporated into the armor through the use of perpendicular electrodes.

As another aspect to this invention, there may be potential to use this same mechanism as a means to remove kinetic energy from projectiles. In this concept, the projectile striking one current collector would cause the foam to start to collapse. As this collapse begins to drive the electrolyte from the foam, there is increased resistance to the projectile, as increasing collapse of the foam causes increasing removal of the charged electrolyte. The invention also includes this method. The energy stored in this system scales as the amount of displaced charge squared, so the total energy in the system increases rapidly.

As a comparative example, a 8 kg projectile, traveling a 2 km/s (representative of the primary armament on a tank), has kinetic energy of 16 MJ, less than the energy required to drive the charging of the capacitor in the previous example. Thus it may be possible to use the displacement of a charged fluid from a charged metal foam as a method to remove the kinetic energy from projectiles with less mass than required for more conventional armor approaches.

EXPERIMENTAL RESULTS

The first step in demonstrating the concept is to fabricate devices that can be crushed. The starting point was a porous Ni metal foam that was 97% porous. Testing showed the foam could be easily crushed to 25% or less of its original thickness just applying relatively light pressure.

Example 1

Figure 9:
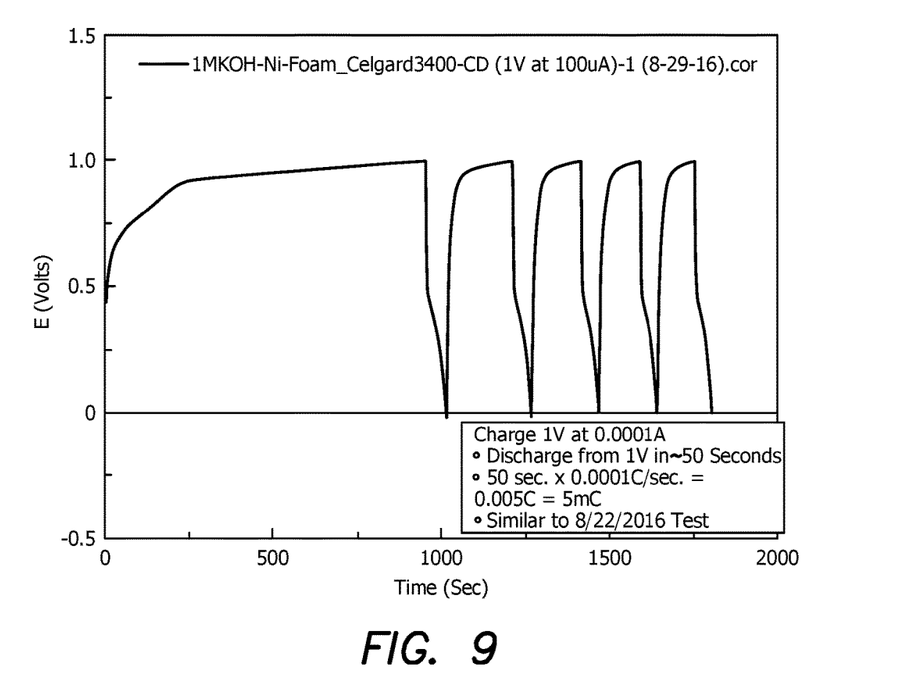
FIG. 9 shows a charge-discharge curve from a typical device.

Two 1 cm×1 cm samples of the Ni foam were soaked in 1M KOH then placed on either side of a Celgard 3400-CD sample to form a capacitor. The device was kept in a solution of 1M KOH. The device was charged at 1 mA to 1.0V, then discharged at a rate 0f 1 mA. The device discharged in 50 seconds, indicating the device capacity was 50 mC. Results from the device are shown in FIG. 9.

Example 2

Two 1 cm×1 cm samples of the Ni foam were soaked in 1M KOH then placed on either side of a piece of polycarbonate sheet to form a capacitor. The electrodes and separator were kept in a solution of 1M KOH. The device was charged at 1 mA to 1.0V, then discharged at a rate of 1 mA. The device discharged in 55 seconds, indicating the device capacity was 55 mC. Charge-discharge results from the device are shown in FIG. 10.

The device was charged to 1.0V, then moved onto a flat surface, and reconnected to measure the voltage. The voltage of the device was observed to decrease in a steady, monotonic manner, due to the self-discharge of the device. Approximately 50 seconds after re-connection, the device was then struck by a three pound hammer. The voltage was observed to immediately increase by approximately 0.3V, and electrolyte was observed to eject from the device. The voltage of the device then decreased in a manner consistent with the prior self-discharge. After approximately 40 seconds, the device was struck again. This impact resulted in a much smaller increase in voltage, and the self-discharge after the second impact changed in shape. The device was impacted a third and fourth time, with progressively smaller jumps in voltage, and more rapid self-discharge. Little electrolyte was observed to eject from the device after the first impact.

Figure 10:
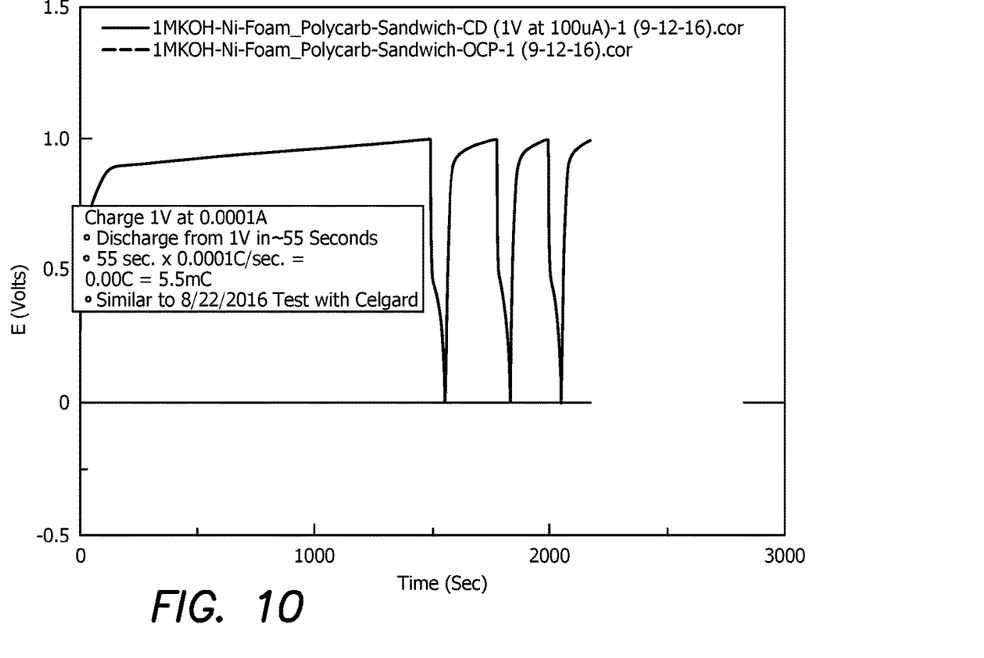
FIG. 10 shows a charge-discharge curve from a typical device.

Additional example devices were fabricated and showed similar behavior to that observed in FIG. 9 and FIG. 10.

Example 3. Control Tests

Figure 11:
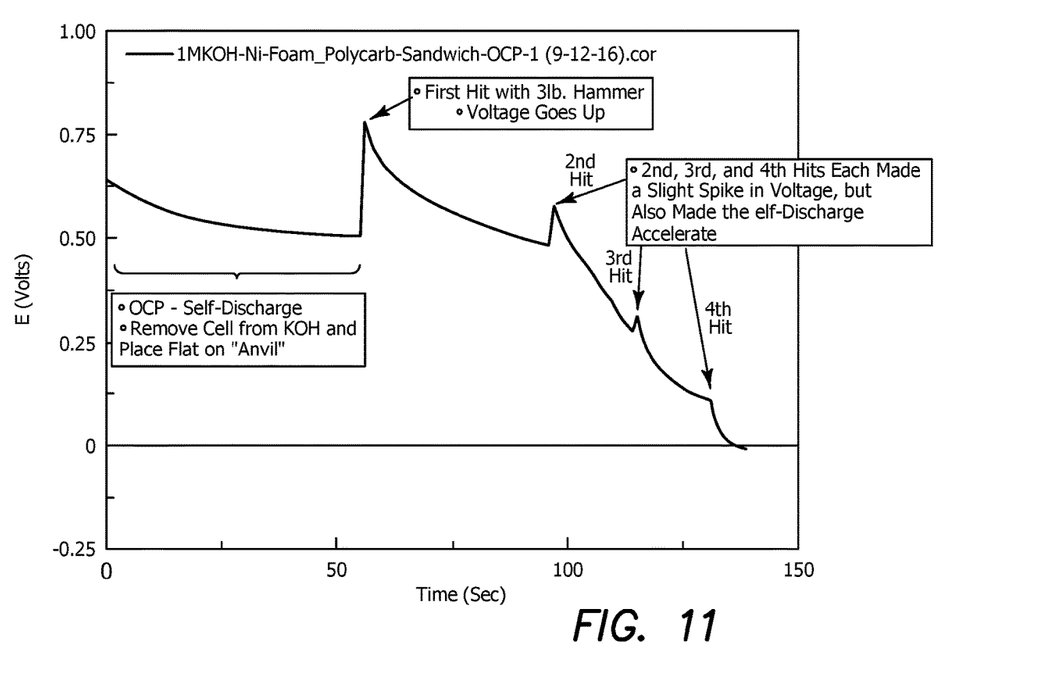
FIG. 11 shows a voltage curve of the device before and after impact.
Figure 12:
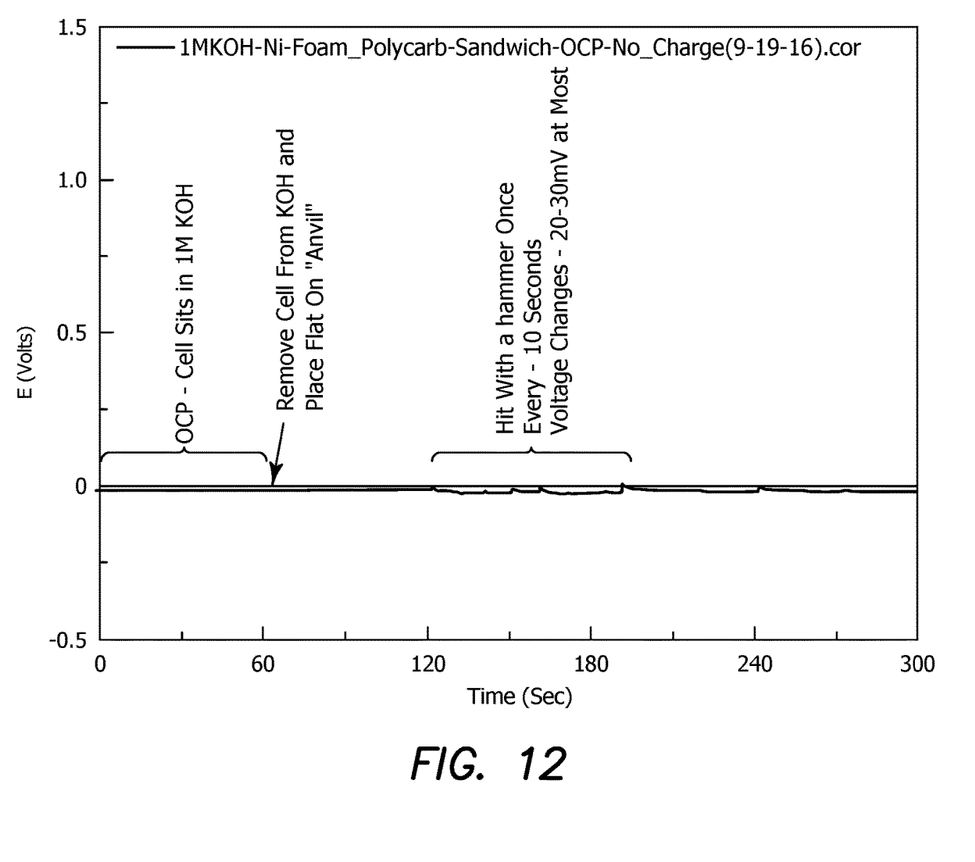
FIG. 12 shows a voltage curve of an uncharged device

To demonstrate that the results in FIG. 11 were due to the proposed mechanism, two control tests were performed. In the first test, a device was fabricated as in the previous example, but was not charged. The device was placed onto a flat surface, then impacted with a three pound hammer, at approximately the same speed as in the previous example. The results of this test are given in FIG. 12. As can be seen, the device which had not been charged showed minimal change in voltage upon impact, even though similar amount of electrolyte was seen to eject from the device upon impact. This result is consistent with the proposed mechanism.

Figure 13:
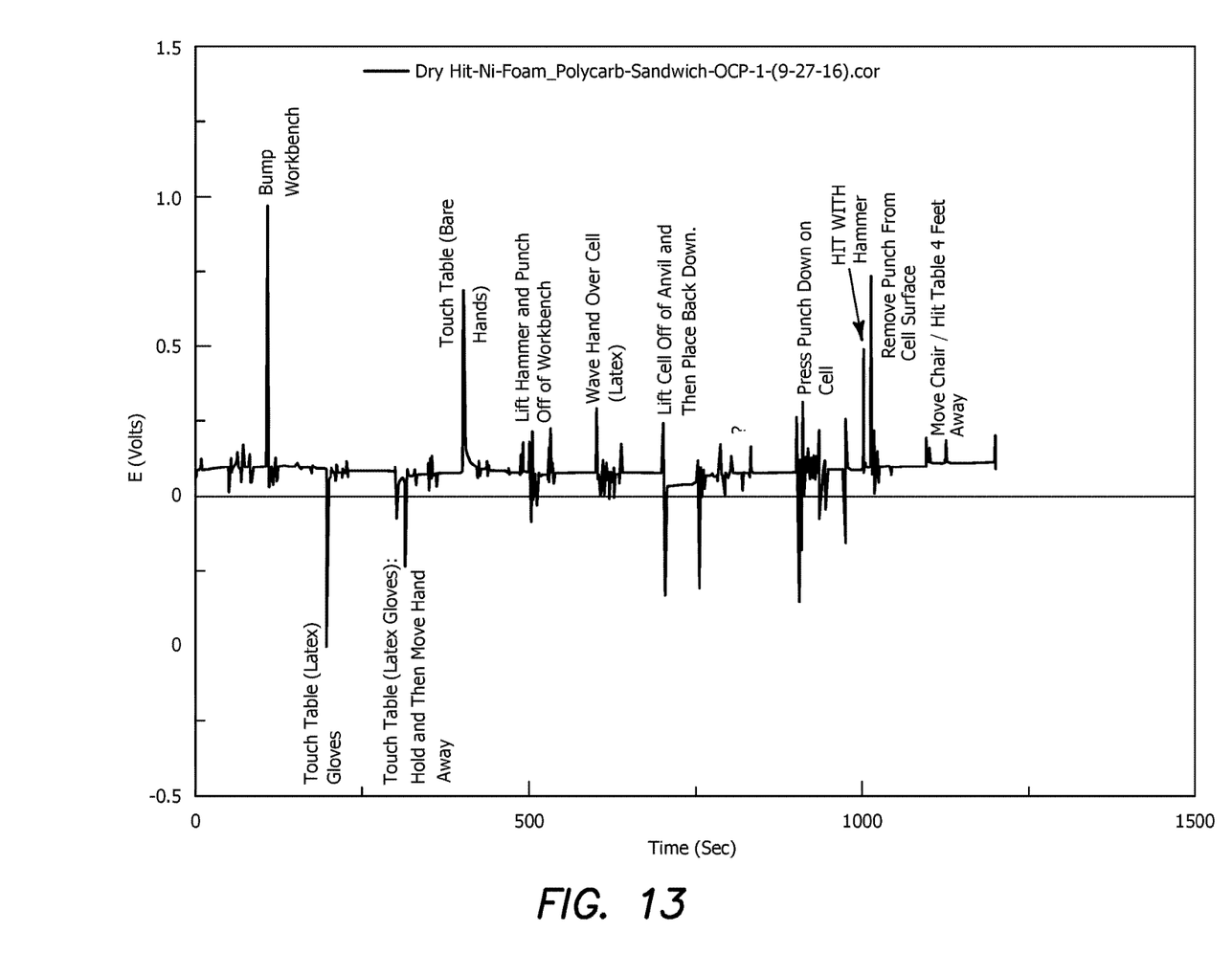
FIG. 13 shows a voltage curve of a device with no electrolyte.

In the second control test, a device was fabricated as in the previous tests, but no electrolyte was introduced into the device. The device was placed onto a flat surface, then impacted with a three pound hammer as before. The results of this test are shown in FIG. 13. As can be seen from the figure, the voltage of the device is not stable, with it changing in response to a range of environmental conditions. The erratic behavior of the voltage of the device indicates there is effectively no charge associated with the voltage change. This is expected, as the effective capacitance of the device with no electrolyte is on the order of pico farad or smaller.

Example 4. Drop Tower Testing

Figure 14:
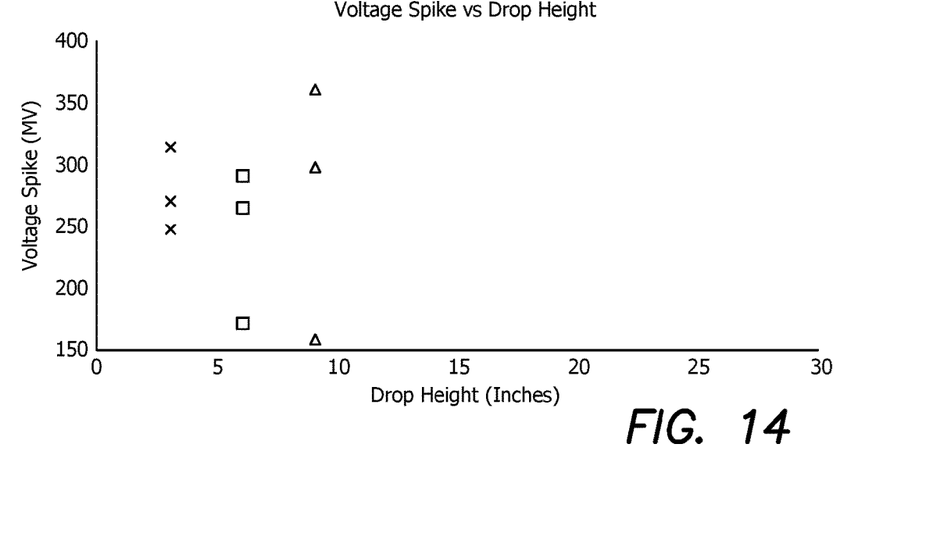
FIG. 14 shows a voltage spike as a function of impact.

In this example, several devices were fabricated as in the previous examples. The devices were charged to 1.0V, then placed onto the stage of a drop tower. A weight was then dropped onto the device from a fixed height, and the increase in the voltage due to impact recorded. FIG. 14 shows the increase in voltage as a function of the drop height. The data suggests there may be an increase in voltage with drop height, although there is enough scatter in the data to make analysis challenging. Several additional tests were performed but not recorded, as the impact resulted in sufficient damage to the device to prevent recording the voltage spike.

Example 5. Alternate Electrode Materials

Figure 15:
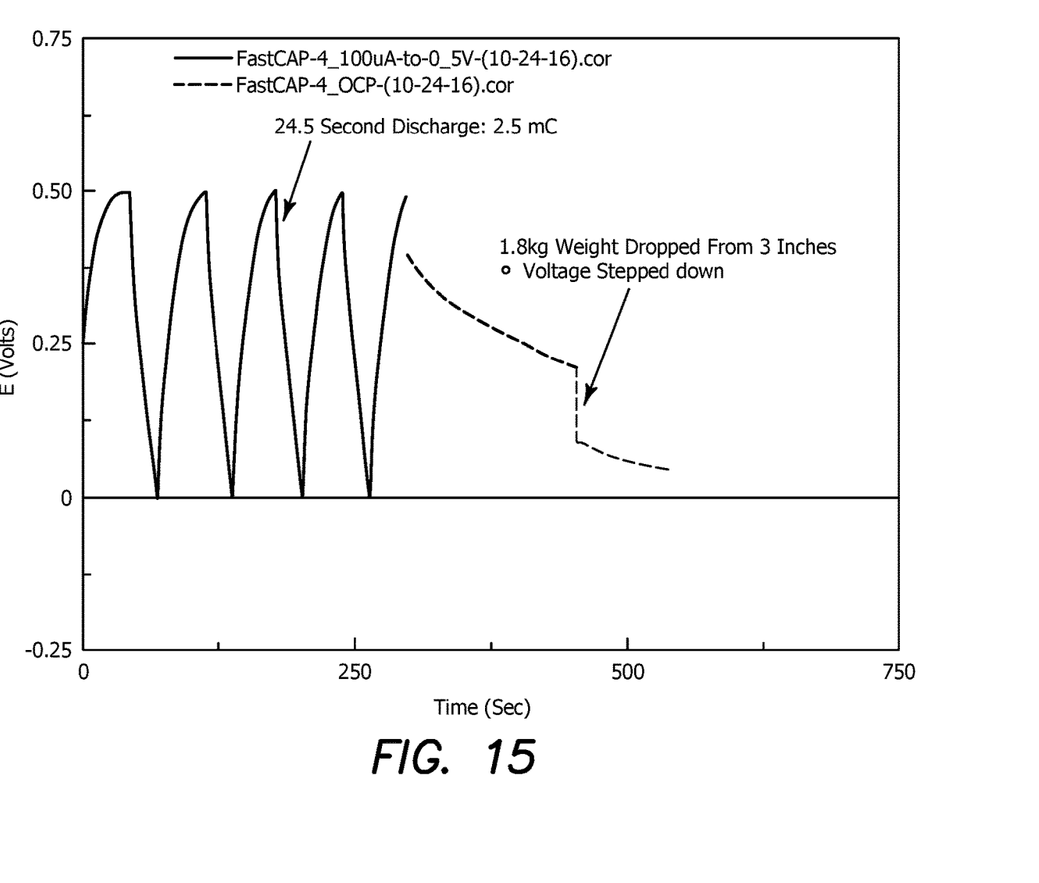
FIG. 15 shows a voltage curve of a device having carbon nanotube (CNT) films as the porous electrodes.

In this example, a device was fabricated using a carbon nanotube (CNT) film as the porous electrodes. The CNT films had high porosity and high surface area. The device was measured to have capacity of 0.25 mC, as shown in FIG. 15. When this device was tested using the drop tower, there was no increase in the voltage due to the impact. In fact, in this case, the voltage was seen to drop. After the test was complete, the device was examined, and it was found that the CNT film fractured. It is felt this is the cause of the voltage decrease upon impact.

What is claimed:
1. An explosion-powered supercapacitor, comprising:
first and second porous electrodes connectable to a power source and resistive load;
a first liquid electrolyte in contact with the first porous electrode;
a second liquid electrolyte in contact with the second porous electrode;
a separator disposed between the first and second electrolytes;
an explosive charge, wherein at least the first or second electrodes are in compressive contact with the explosive charge such that an explosion from the explosive charge would compress the first and second electrodes together to drive a current through the resistive load.
2. The supercapacitor of claim 1, comprising at least one electrolyte outlet.
3. The supercapacitor of claim 1 wherein first and second electrodes are directly adjacent to the separator.
4. The supercapacitor of claim 1 wherein the composition of the first electrolyte and the composition of the second electrolyte are the same.
5. The supercapacitor of claim 2 comprising a plurality of outlets.
6. The supercapacitor of claim 2 comprising two outlets for the electrolyte from the first electrode and two outlets for the electrolyte from the second electrode.
7. The supercapacitor of claim 1 comprising a high surface area of a conductive foam.
8. The supercapacitor of claim 7 wherein the conductive foam has a surface area of 100 $m^2/g$ or higher.
9. The supercapacitor of claim 7 wherein the conductive foam has an open pore structure.
10. The supercapacitor of claim 1, having been placed into an electrolyte solution, causing the supercapacitor to be charged until the amount of charge is saturated at the operating voltage of the electrolyte.

11. The supercapacitor of claim 9 comprising at least carbon-based composite materials; metal oxides; conductive polymers; or mixtures of these materials.

12. The supercapacitor of claim 11 wherein the conductive foam comprises a porous nickel foam.

13. The supercapacitor of claim 9 having connective porosity so that the electrolyte is expressed from the electrodes by a wavefront.

14. The supercapacitor of claim 1 wherein the electrolyte is a mixture of a solvent and at least 1 dissolved chemical.

15. The supercapacitor of claim 14 being wherein the solvent is water or an organic solvent.

16. A method of generating an energy pulse, comprising:
providing a supercapacitor, comprising:
  first and second porous electrodes connectable to a power source and a resistive load;
  a first liquid electrolyte in contact with the first porous electrode;
  a second liquid electrolyte in contact with the second porous electrode;
  a separator disposed between the first and second electrolytes;
applying a potential between the first and second porous electrodes;
creating an explosion that compresses the electrodes and reduces the volume of each porous electrode and ejects electrolyte from the porous electrodes thus increasing the potential between the electrodes and increasing the energy stored in the supercapacitor; and subsequently discharging at least a portion of the energy stored in the supercapacitor.

17. The method of claim 16 wherein at least 0.01% of the chemical energy of the explosive charge is converted to electrical energy, more preferably at least 0.05%, or at least 0.1%, or at least 1%.

18. The method of claim 16 wherein the step of compressing is sufficiently fast such that at least 0.1%, or at least 0.5%, or at least 1.0%, or at least 2.0%, or up to 20% or up to 10% of the net charge contained in the electrolyte within the electrodes is ejected with the electrolyte during compression.

19. The method of claim 17 wherein the step of compressing is sufficiently fast such that at least 0.1%, or at least 0.5%, or at least 1.0%, or at least 2.0%, or up to 20% or up to 10% of the net charge contained in the electrolyte within the electrodes is ejected with the electrolyte during compression.

20. A method of converting chemical energy to electrical energy, comprising: wherein energy is initially stored as chemical energy in an explosive charge;
  triggering the explosion to convert the chemical energy to kinetic energy associated with an explosive wavefront;
  wherein the impact of the wavefront on the electrode transfers kinetic energy to an electrolyte in a supercapacitor having porous conductive electrodes;
  converting a portion of the transferred kinetic energy in the electrolyte to electrical energy stored in the supercapacitor.

* * * * *